United States Patent [19]
Ishii

[11] Patent Number: 5,515,257
[45] Date of Patent: May 7, 1996

[54] AC-DC CONVERTER

[75] Inventor: Masanori Ishii, Kawagoe, Japan

[73] Assignee: Toko, Inc., Tokyo, Japan

[21] Appl. No.: 302,264

[22] Filed: Sep. 8, 1994

[30] Foreign Application Priority Data

Sep. 17, 1993 [JP] Japan ..................... 5-254757

[51] Int. Cl.$^6$ ............................ H02M 3/335; G05F 1/40
[52] U.S. Cl. ................................. 363/21; 323/282
[58] Field of Search ................... 363/21, 23, 25; 323/222, 282, 285

[56] References Cited

U.S. PATENT DOCUMENTS

| | | | |
|---|---|---|---|
| 4,025,863 | 5/1977 | Higuchi et al. | 363/21 |
| 4,150,423 | 4/1979 | Boschert | 363/21 |
| 5,218,522 | 6/1993 | Phelps et al. | 363/25 |
| 5,414,610 | 5/1995 | Brainard | 363/21 |
| 5,418,704 | 5/1995 | Hua et al. | 363/21 |

FOREIGN PATENT DOCUMENTS 4-61425  7/1993  Japan.

*Primary Examiner*—Matthew V. Nguyen
*Attorney, Agent, or Firm*—Dressler, Goldsmith, Shore & Milnamow, Ltd.

[57] ABSTRACT

The present invention provides an AC-DC converter in which a voltage at a light load is kept from rising, and an application range of an AC input voltage can be made broader. In the AC-DC converter having a rectifier 3, a boost chopper 4 and a DC—DC converter, a PWM circuit 6, a frequency divider 7 and a peak value detector 8 are further arranged. A first pulse signal $V_{pa}$ which the PWM circuit 6 outputs is inputted to a first switching transistor Q1 in the DC—DC converter 5 and the frequency divider 7. The frequency divider 7 divides a frequency of the first pulse signal $V_{pa}$ according to a frequency dividing control signal which the peak value detector 8 outputs, for monitoring a rectified output voltage in the rectifier 3 and outputs a second pulse signal $V_{pb}$ generated by the frequency divider 7 to the second switching transistor Q2 in the boost chopper 4.

3 Claims, 2 Drawing Sheets

AC-DC CONVERTER

BACKGROUND OF THE INVENTION

1. Technical Field

The present invention relates to an AC-DC converter of a type having an improved power factor including means for keeping a voltage in the converter at a light load from rising.

2. Description of the Prior Art

A conventional AC-DC converter has an active filter with a boost chopper as well as a rectifier for rectifying an AC input voltage and a DC—DC converter for obtaining a stabilized DC output, by which the power factor of the converter is improved.

Previously, the applicant proposed an AC-DC converter having circuit structures shown in FIG. 4 in JP Utility Model Application No. 4-61425.

In the circuit structures shown in FIG. 4, a first switching transistor Q1 and a second switching transistor Q2 are simultaneously driven by a driving signal $v_p$ from a pulse width modulation circuit (hereinafter referred to as a PWM circuit) as the same converter driving circuit.

So far control circuits or multipliers, and PWM circuits driving switching transistors by signals from the control circuits have been arranged independently to a DC—DC converter 5 and a boost chopper 4, respectively. However, because only a set of the control circuit or the multiplier, and the PWM circuit can be disposed in a circuit as shown in FIG. 4, the circuit structures can be simple and a circuit device can be small in size. Also, in comparison with an AC-DC converter having two control circuits and two signal frequencies, effects that noise generated by EMI can be highly reduced are obtained by this AC-DC converter.

SUMMARY OF THE INVENTION

That the first switching transistor Q1 in the DC—DC converter 5 and the second switching transistor Q2 in the boost chopper 4 are simultaneously driven by the same driving signal means that ON periods of both transistors are the same. Accordingly, in case that a light load is connected between output terminals 2A, 2B in the circuit as shown in FIG. 4, from relationship between a power supplied to the load of the DC—DC converter 5 and a power managed in the boost chopper 4, there is a possibility that a voltage $V_c$ appearing across an output capacitor C1 in the boost chopper 4 highly rises.

For this voltage rise in the circuit, circuit components having a high withstand voltage must be used and then, the circuit becomes larger in size. In addition, it is not easy to make an application range of AC input voltage broad, e.g. so as to use for both AC 100 v and 200 v because the voltage rise in the circuit highly changes according to a value of an AC voltage inputted to a rectifier 3.

Accordingly, an object of the present invention is to provide an AC-DC converter of a type having an improved power factor which is small in size, and in which an application range of an AC input voltage can be broader by keeping a voltage in the converter at a light load from rising.

According to the invention, an AC-DC converter having a rectifier for rectifying an AC input voltage from an AC power source line, a boost chopper for boosting up the rectified output voltage of the rectifier, and a DC—DC converter for receiving a high output voltage of the boost chopper, and supplying a stabilized DC voltage to a load, comprising:

a converter driving circuit for detecting an output voltage of the AC-DC converter and outputting a first pulse signal having a pulse width according to said output voltage;

a peak value detector for detecting a peak value of the rectified output voltage of the rectifier and outputting a signal according to the peak value, or instead of the peak value detector a voltage detector for detecting a voltage risen by the boost chopper and outputting a control signal according to a value of the detected voltage; and a frequency divider for outputting a second pulse signal obtained by dividing the frequency of the first pulse signal according to the signal from the peak value detector or the voltage detector, whereby the DC—DC converter is driven by the first pulse signal and the boost chopper is driven by the second pulse signal.

DESCRIPTION OF THE PREFERRED EMBODIMENT

Figure 1:
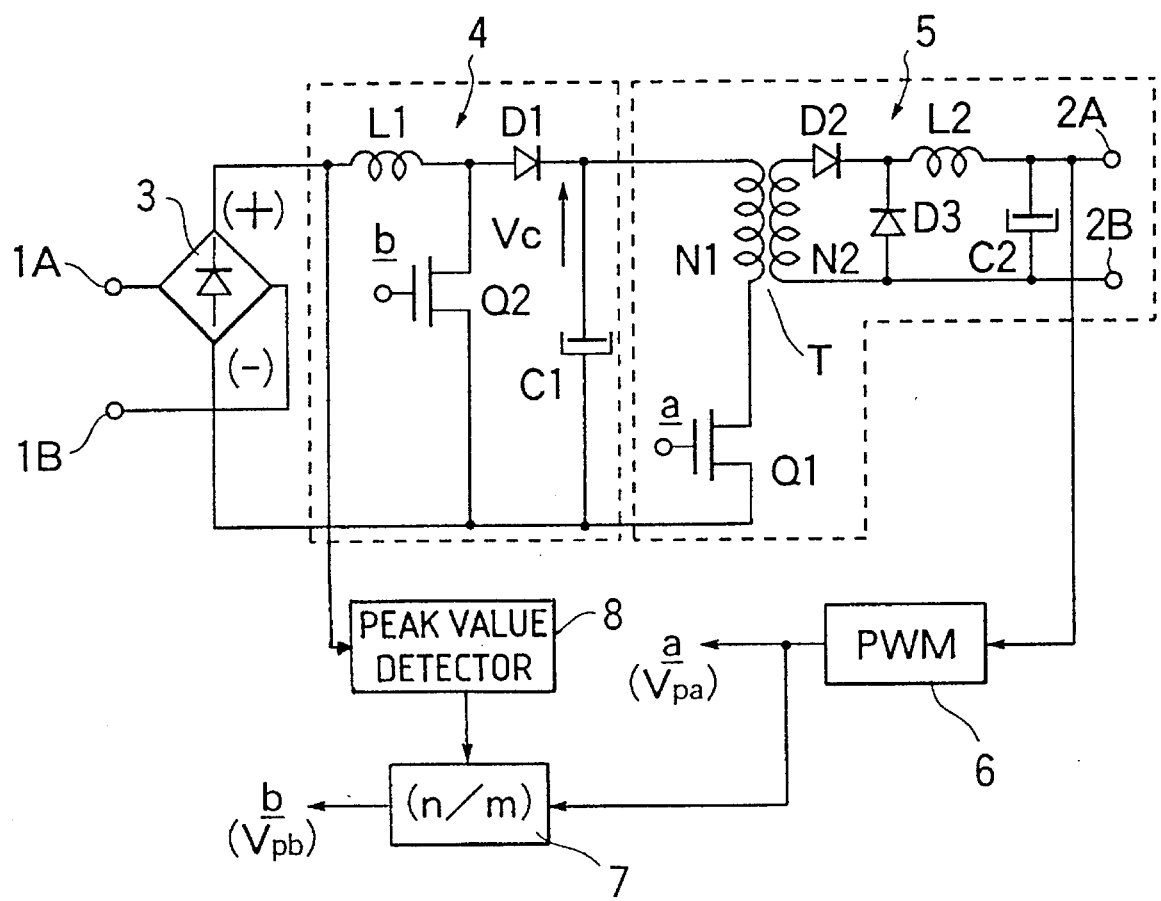
FIG. 1 shows an embodiment of an AC-DC converter according to the present invention.
Figure 4:
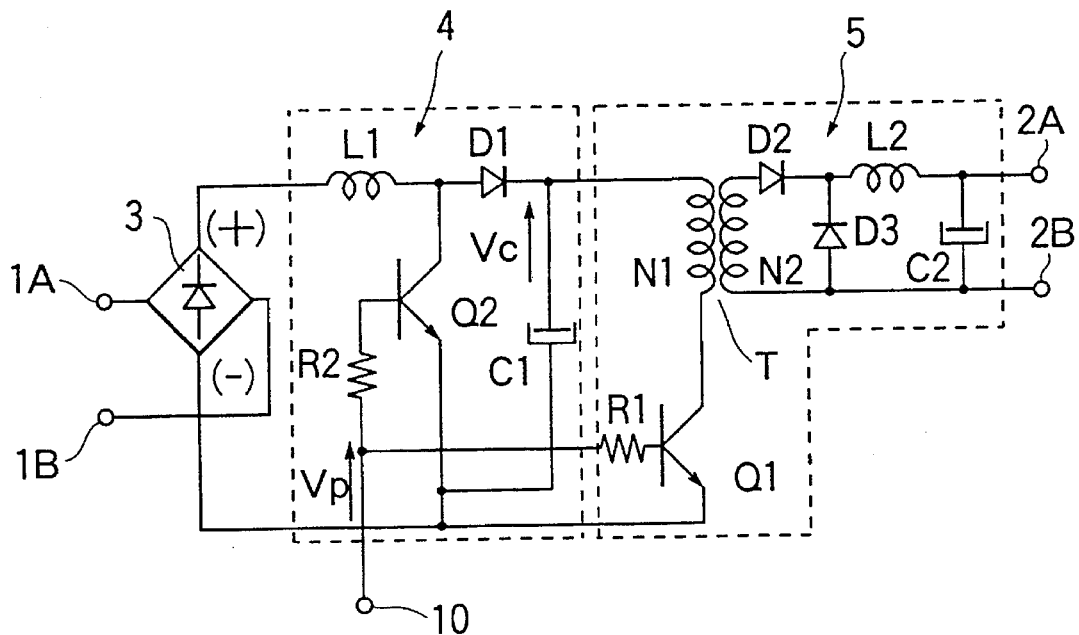
FIG. 4 shows a conventional AC-DC converter.

FIG. 1 illustrates an AC-DC converter according to the present invention which can make an application range of an AC input voltage broad. In FIG. 1, it should be noted that the same elements as those shown in FIG. 4 are given the same reference numerals.

In FIG. 1, the AC-DC converter has circuit structures as follows.

1A and 1B are input terminals connected to an AC power supply and each of input terminals is connected to the AC input terminals of a rectifier 3. A DC positive-side output terminal of the rectifier 3 is connected to an anode of a diode D1 through a choke coil L1. A cathode of the diode D1 is connected to one end of a primary winding N1 of a converter transformer T, another end of which is connected to a drain of a first switching transistor Q1. Also, a source of the first switching transistor Q1 is connected to a negative-side output terminal of the rectifier 3.

A drain and a source terminals of a second transistor Q2 are connected between the anode of the diode D1 and the negative-side output terminal of the rectifier 3, and an output capacitor C1 is connected between the cathode of the diode D1 and the negative-side output terminal of the rectifier 3.

One end of a secondary winding N2 of the converter transformer T is connected to an output terminal 2B, another end of which is to an anode of a diode D2. A cathode of the diode D2 is connected to an output terminal 2A through a choke coil L2 and further, to a cathode of a flywheel diode D3. An anode of the flywheel diode D3 is connected to the output terminal 2B. A smoothing capacitor C2 is connected between the output terminals 2A, 2B.

In the circuit structures as described above, a boost chopper 4 comprises the choke coil L1, the diode D1, the second switching transistor Q2 and the output capacitor C1, and also, a DC—DC converter 5 comprises the converter transformer T, the first switching transistor Q1, the diode D2, the flywheel diode D3, the choke coil L2 and the smoothing capacitor C2.

Further, in FIG. 1, a PWM circuit 6, a frequency divider 7 and a peak value detector 8 are arranged as follows in order to drive the boost chopper 4 and the DC—DC converter 5.

A feedback input terminal of the PWM circuit 6 as a drive circuit for driving the AC-DC converter is connected to the output terminal 2A, and a pulse output terminal of the PWM circuit 6 is connected to a gate of the first switching transistor Q1 and a pulse input terminal of the frequency divider 7. A control input terminal of the frequency divider 7 is connected to an output terminal of the peak value detector 8. An output terminal of the frequency divider 7 is connected to a gate of the switching transistor Q2. A detected voltage input terminal of the peak value detector 8 is connected to a positive-side output terminal of the rectifier 3.

In the AC-DC converter having circuit structures as described above, assuming a standard state when an AC voltage such as 100 v is applied to the input terminals 1A, 1B, in case that different AC voltages such as AC 100 v, 200v are applied to the input terminals 1A, 1B, its operation is as follows.

When the AC voltage applied to the input terminals 1A, 1B is 100 v, first, the DC—DC converter 5 operates by a first pulse signal $V_{pa}$ inputted from the PWM circuit 6 to the first switching transistor Q1. The first pulse signal $V_{pa}$ that the PWM circuit 6 outputs is also inputted to the frequency divider 7. The frequency divider 7 receives a frequency dividing control signal from the peak value detector 8, and makes a frequency dividing ratio n/m one, and outputs the second pulse signal $V_{pb}$ having the same period as the first pulse signal $V_{pa}$ to the gate of the second switching transistor Q2. Thereby the DC—DC converter 5 and the boost chopper 4 shown in FIG. 1 are simultaneously driven like an AC-DC converter shown in FIG. 4.

Figure 2:
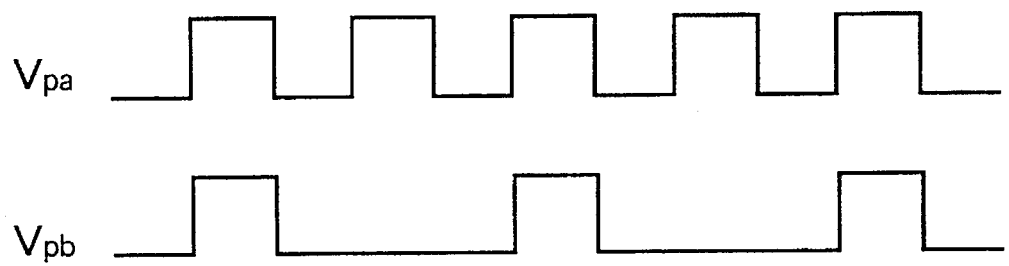
FIG. 2 shows wave forms of a first and a second pulse signals.

On the contrary, if an AC voltage applied to the input terminals 1A, 1B is 200 v, the frequency divider 7 receives a frequency dividing control signal from the peak value detector 8, and changes a frequency dividing ratio n/m to e.g. ½. Then, as shown in FIG. 2, the second pulse signal $V_{pb}$, the pulse period of which is twice that of the first pulse signal $V_{pa}$, is inputted from the frequency divider 7 to the gate of the second switching transistor Q2.

Thereby, the operation number of the boost chopper 4 within a predetermined period reduces, as compared with the operation number of the DC—DC converter 5, and a voltage V c produced across the output capacitor C2 is kept lower, as compared with a case that the boost chopper 4 and the DC—DC converter 5 are simultaneously driven.

Accordingly, a load connected between the output terminals 2A, 2B is at a light load state, and even if the voltage in the AC-DC converter rises, the voltage in the AC-DC converter does not extremely rise by a value of the AC input voltage in comparison with the AC-DC converter proposed by the same applicant, and then, it can be done to make the application range of the AC input voltage in the AC-DC converter broad.

In the embodiment of the the AC-DC converter shown in FIG. 1 according to the invention, when an AC inputted voltage is high, it is such that the voltage V c produced across the output capacitor C1 of the boost chopper 4 can be preventing from rising by making the frequency division of the first pulse signal large and the period of the second pulse signal long.

On the contrary, considered is a means for preventing the voltage $V_c$ from rising, by directly monitoring the voltage $V_c$ produced across the output capacitor C1, highly dividing the frequency of the first pulse signal if the voltage $V_c$ rises, and making the period of the second pulse signal long.

Figure 3:
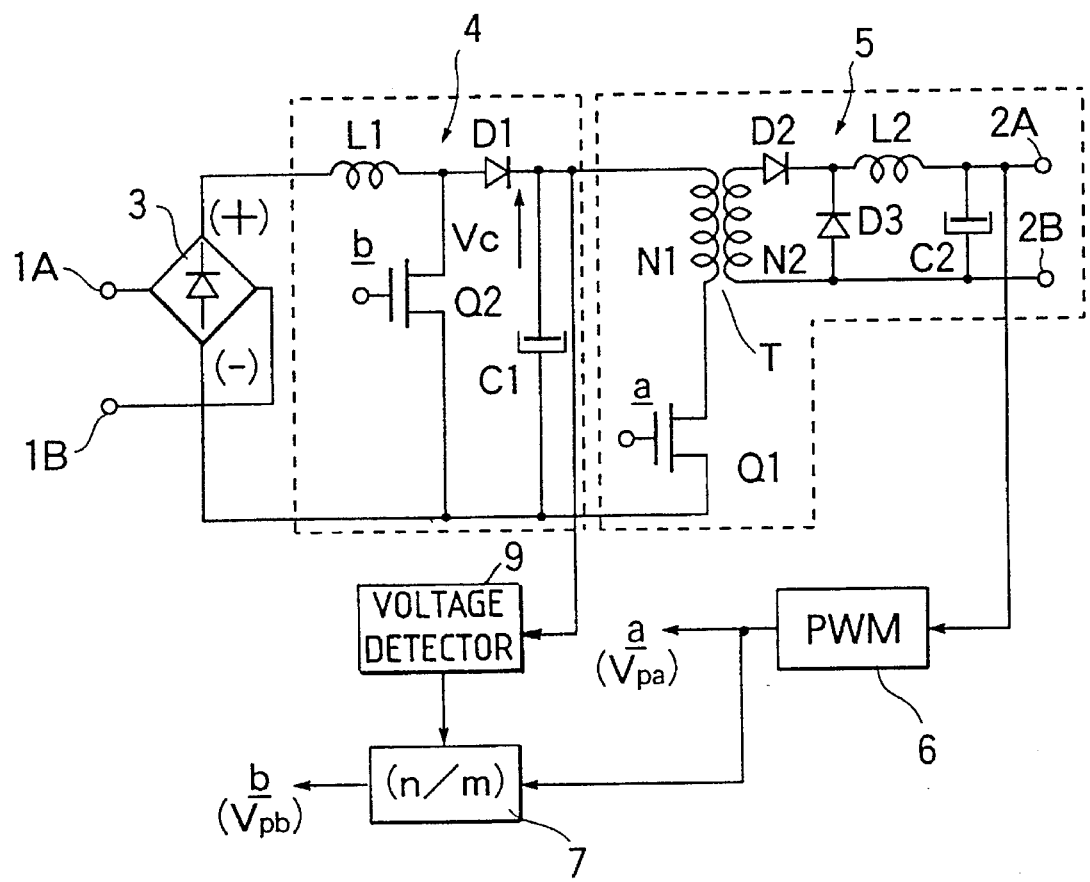
FIG. 3 shows another embodiment of an AC-DC converter according to the present invention.

FIG. 3 shows another embodiment according to the invention in which the above-mentioned means is used.

In a circuit as shown in FIG. 3, a voltage detector 9 is arranged, instead of the peak value detector 8 as shown in FIG. 1. An detected voltage input terminal of the voltage detector 9 is connected to a connection point of a diode D1 and an output capacitor C1, and a control output terminal of the voltage detector 9 is connected to a control input terminal of a frequency divider 7. Another circuit components are identical to the circuit components in FIG. 1.

In the circuit as shown in FIG. 3, the voltage detector 9 monitors the voltage $V_c$ and outputs the control signal when the voltage $V_c$ rises. The frequency divider 7 changes amount of the frequency division of the first pulse signal $V_{pa}$ according to the control signal. As a result, the period of the second pulse signal $V_{pb}$ becomes longer and the voltage $V_c$ can be kept from rising. Accordingly, in case that an AC voltage applied to input terminals 1A, 1B is high, or a load connected between output terminals 2A, 2B is low, the voltage $V_c$ can be kept from rising and an application range of the AC input voltage in the AC-DC converter can be broader.

The present invention has structural features that the frequency divider and the peak value detector or the voltage detector instead of the peak value detector are additionally connected to the previously proposed AC-DC converter, thereby the frequency of the first pulse signal driving the DC—DC converter is divided through the frequency divider according to the control signal from the peak value detector or the voltage detector, and the boost chopper is driven by the second pulse signal generated by the division.

The AC-DC converter according to the present invention has advantages that the voltage in the converter is kept from rising at light load, and the application range of the AC input voltage is broad as well as advantages that it is simple in structure, high in power factor, cheap in cost and small in size, and that noise generation of EMI is suppressed.

I claim:

1. An AC-DC converter having a rectifier for rectifying an AC input voltage from an AC power supply, a boost chopper for boosting up a rectified output voltage of the rectifier, and a DC—DC converter for receiving a high output voltage of the boost chopper and supplying a stabilized DC voltage to a load, said AC-DC converter comprising:

a converter driving circuit for detecting an output voltage of the AC-DC converter and outputting a first pulse signal having a pulse width according to said output voltage; and a frequency divider, in which a division amount may be made variable, for receiving said first pulse signal from said converter driving circuit, dividing the frequency of said first pulse signal by the division amount, and outputting a second pulse signal having a pulse period which is n/m (m<n) of a period of said first pulse signal; and wherein said DC—DC converter is driven by said first pulse signal and said booster chopper is driven by said second pulse signal.

2. An AC-DC converter having a rectifier for rectifying an AC input voltage from an AC power supply, a boost chopper for boosting up a rectified output voltage of the rectifier, and a DC—DC converter for receiving a high output voltage of the boost chopper and supplying a stabilized DC voltage to a load, said AC-DC converter comprising:

a converter driving circuit for detecting an output voltage of the AC-DC converter and outputting a first pulse signal having a pulse width according to said output voltage;

a peak value detector for detecting a peak value of the rectified output voltage of the rectifier and outputting a signal according to said peak value;

a frequency divider for receiving said first pulse signal from said converter driving circuit and said signal from said peak value detector, dividing the pulse frequency of said first pulse signal by a division amount according to said signal from said peak value detector, and outputting a second pulse signal having a pulse period which is n/m (m≦n) of the pulse period of said first pulse signal;

wherein said DC—DC converter is driven by said first pulse signal and said boost chopper is driven by said second pulse signal; and wherein said frequency divider receives said signal from said peak value detector according to the AC voltage inputted to said AC-DC converter and changes the division amount of the frequency of said first pulse signal.

3. An AC-DC converter having a rectifier for rectifying an AC input voltage from an AC power supply, a boost chopper for boosting up a rectified output voltage of the rectifier, and a DC—DC converter for receiving a high output voltage of the boost chopper and supplying a stabilized DC voltage to a load, said AC-DC converter comprising:

a converter driving circuit for detecting an output voltage of the AC-DC converter and outputting a first pulse signal having a pulse width according to said output voltage;

a voltage detector for detecting a voltage boosted up through the boost chopper and outputting a control signal according to said detected voltage;

a frequency divider for receiving said first pulse signal from said converter driving circuit and said control signal from said voltage detector, dividing the pulse frequency of said first pulse signal by a division amount according to said control signal, and outputting a second pulse signal having a pulse period which is n/m (m≦n) of the pulse period of said first pulse signal;

wherein said DC—DC converter is driven by said first pulse signal and said boost chopper is driven by said second pulse signal; and wherein said frequency divider receives said signal from said voltage detector according to the voltage value boosted up through said booster chopper and changes the division amount of the frequency of said first pulse signal.

* * * * *